(12) United States Patent
Kusano (10) Patent No.: US 9,906,380 B2
(45) Date of Patent: Feb. 27, 2018

(54) VIRTUALIZATION METHOD FOR AN ACCESS NETWORK SYSTEM AND ITS MANAGEMENT ARCHITECTURE

(71) Applicant: Oliver Solutions Ltd., Herzliya (IL)

(72) Inventor: Toshihiko Kusano, Kawasaki (JP)

( * ) Notice: Subject to any disclaimer, the term of this patent is extended or adjusted under 35 U.S.C. 154(b) by 121 days.

(21) Appl. No.: 14/810,376

(22) Filed: Jul. 27, 2015

(65) Prior Publication Data

US 2016/0036601 A1    Feb. 4, 2016

Related U.S. Application Data

(60) Provisional application No. 62/032,578, filed on Aug. 3, 2014.

(51) Int. Cl.
*H04L 12/64* (2006.01)
*G06F 9/455* (2018.01)

(52) U.S. Cl.
CPC .............. *H04L 12/6418* (2013.01); *G06F 2009/45595* (2013.01)

(58) Field of Classification Search
CPC ......... H04L 12/6418; H04L 2012/6443; G06F 9/5072
See application file for complete search history.

(56) References Cited

U.S. PATENT DOCUMENTS

| | | | | |
|---|---|---|---|---|
| 7,953,865 B1 * | 5/2011 | Miller | ................ | H04L 12/6418 370/254 |
| 2015/0207586 A1 * | 7/2015 | Xia | .................... | H04J 14/0269 398/48 |
| 2015/0333979 A1 * | 11/2015 | Schwengler | ........ | H04L 41/5054 709/226 |
| 2016/0301593 A1 * | 10/2016 | Blair | .................... | H04L 12/4641 |
| 2016/0330074 A1 * | 11/2016 | Cook | .................. | H04L 12/4641 |
| 2016/0330140 A1 * | 11/2016 | Cook | .................. | H04L 12/4641 |
| 2016/0380886 A1 * | 12/2016 | Blair | ....................... | H04L 45/50 398/49 |

(Continued)

OTHER PUBLICATIONS

Siqueira et al., An Optical SDN Controller for Transport Network Virtualization and Autonomic Operation, Dec. 9, 2013-Dec. 13, 2013, Globecom Workshops (GC Wkshps), 2013 IEEE, p. 1198-1203 (6 pages).*

(Continued)

*Primary Examiner* — Hoon J Chung (57) ABSTRACT

A virtual access node comprising of a Central Office (CO) and more than one Customer Premises Equipment (CPE), that can be a mixture of a SDN native and a SDN non-native device, supports a virtualized access Network Node Interface (NNI) in the CO and a virtualized access User Network Interface (UNI) in the CPE. A Software Defined Network (SDN) Management System using a SDN control message configures an user data flow in the virtual access node by designating a virtualized access NNI, a virtualized access UNI, and flow forwarding configuration parameters without specifying exact flow forwarding resources. The virtual access node allocates and configures a set of required flow forwarding resources which are distributed in the CO and/or the CPE by that device oriented partitioned control messages with translating in the legacy control message when the resource is in a SDN non-native device.

5 Claims, 6 Drawing Sheets

(56) References Cited

U.S. PATENT DOCUMENTS

2017/0070412 A1* 3/2017 Kanevsky ............... H04L 43/10

OTHER PUBLICATIONS

Kang et al., Software-Defined Infrastructure and the Future Central Office, Jun. 9, 2013-Jun. 13, 2013, Communications Workshops (ICC), 2013 IEEE International Conference on Communications 2013, p. 225-229 (5 pages).*

* cited by examiner

| Res. ID | CPE 301 / 310 | | | | CO 320 | | | |
| --- | --- | --- | --- | --- | --- | --- | --- | --- |
| | Classifier | Modifier | Policer / Shaper | Scheduler | Classifier | Modifier | Policer / Shaper | Scheduler |
| 1-1 | Supported 1 | Supported 1 | Supported 1 | Supported 1 | Supported 10 | Supported 10 | Supported 10 | Supported 10 |
| 1-M | Not Supported | Not Supported | Not Supported | Not Supported | | | | |
| J-1 | Not Supported | Not Supported | Supported 1 | Supported 1 | Supported 5 | Supported 5 | Not Supported | Not Supported |
| J-N | Supported 1 | Supported 1 | Not Supported | Not Supported | | | | |

| Flow ID | Res. ID | CPE 410 | | | | CO 420 | | | |
|---|---|---|---|---|---|---|---|---|---|
| | | Classifier | Modifier | Policer / Shaper | Scheduler | Classifier | Modifier | Policer / Shaper | Scheduler |
| 1 | 1-1 | Use | Use | No use | No use | No Use | No Use | Use | Use |
| | 1-M | | | | | | | | |
| 2 | J-1 | NA | NA | Use | Use | Use | Use | NA | NA |
| | J-N | | | | | | | | |

VIRTUALIZATION METHOD FOR AN ACCESS NETWORK SYSTEM AND ITS MANAGEMENT ARCHITECTURE

CROSS REFERENCE TO RELATED APPLICATIONS

This application claims priority benefit of U.S. Provisional Application No. 62/032,578, filed on Aug. 3, 2014 by inventor Toshihiko Kusano

FIELD OF THE INVENTION

The present invention relates to a network virtualization for a telecommunication network node comprises of SDN non-native devices to manage them seamlessly among with SDN native devices from a SDN Management System.

The present invention is particularity suitable for an access node comprises a Central Office (CO) and more than one Customer Premises Equipment (CPE).

BACKGROUND OF THE INVENTION

Recently, Software Defined Network (SDN) has been widely recognized as the next generation network management scheme in the packetized data communication era. Current SDN defines SDN native control message and protocol, OpenFlow is the well-known standard for the control message, but it may not be true to determine the protocol is the only choice applicable to the SDN concept. Hereinafter use "SDN control message" as a generalized protocol name which can be used for SDN.

In the origin of the OpenFlow, it has been assumed to control a standalone OpenFlow device which will replace today's Layer two (2) switches (L2SW) and routers; all of them are not in a form of multi node system. Compare with the L2SWs and routers, access network system is comprised of a CO and more than one CPE and they are tightly coupled in its configuration. For example, the Passive Optical Network (PON) technology which is used for the Fiber To The X (FTTX, X stands various types of delivery method) service consists from an Optical Line Terminator (OLT) as a CO device and plural Optical Network Unit (ONU) as a CPE device. The OLT controls the ONUs with specific control protocols, which are known as Multi-Point Control Protocol (MPCP) and Operation Administration and Maintenance (OAM) protocol. If operator wants to apply the current OpenFlow control message to those devices, both the OLT and the corresponding ONU need to be OpenFlow native devices.

Although applying an integrated SDN management across the network including the access node can maximize the benefit in the CPAEX and the OPEX, network operators have deployed the legacy access nodes in large and then it becomes a significant disadvantage for operators who want to use OpenFlow because each of the standalone device must be a standalone SDN native device. This situation will enforce operators to replace the whole legacy access nodes if they plan to manage them under integrated SDN management, especially the replacement of the whole CPE in the customer premises will cause a severe service disruption.

From this background, it is proposed to virtualize an access node as a single SDN native node, and thereinafter, the SDN Management System can control the access node without being aware the actual type of device but control and manage it as the SDN native device.

SUMMARY OF THE INVENTION

It is therefore an object of the present invention is to support a SDN adapted virtual access node which can be controlled by SDN Management System as same as a SDN native device.

According to the present invention, there is provided a telecommunication network system comprising of; a SDN Management System, virtual access node comprising a Central Office (CO) and more than one Customer Premises Equipment (CPE), user terminals, and a core data network. A plurality of interface points consisting of more than one virtualized access User Network Interface (UNI), wherein each of the more than one virtualized access UNI corresponds to each of the more than one CPE and provides an interface point between the corresponding user terminal, and a virtualized access Network Node Interface (NNI) provides an interface point between the CO and a core data network. The SDN Management System controls the virtual access node as a single device without knowing its internal structure.

The present invention consists from; a) a virtual access node comprises mixture of a CO which can be either SDN native or SDN non-native, more than one CPE which can be either SDN native or SDN non-native and b) a control mechanism for flow forwarding configuration inside of the virtual access node as a single node which is underlying a multi-device structure.

Following previously filed two patents have supportive role to the current patent; PCT/IL13/050947 entitled "TELECOMMUNICATION NETWORK NODE SUPPORTING HYBRID MANAGEMENT USING A HARDWARE ABSTRACTION AND MANAGEMENT PROTOCOL CROSS-CONNECT FUNCTION" claims the control message cross-connect function in the CO to deliver the OpenFlow message to legacy CPE, and U.S. patent Ser. No. 14/256,011 entitled "ARCHITECTURE FOR AN ACCESS NETWORK SYSTEM MANAGEMENT PROTOCOL CONTROL UNDER HETEROGENEOUS NETWORK MANAGEMENT ENVIRONMENT" claims message bridging and encapsulation function which is an element to realize the current patent.

BRIEF DESCRIPTION OF THE DRAWINGS

The present invention will be described in further details with reference to the accompanying drawings, in which.

DETAILED DESCRIPTION OF THE INVENTION

Figure 1:
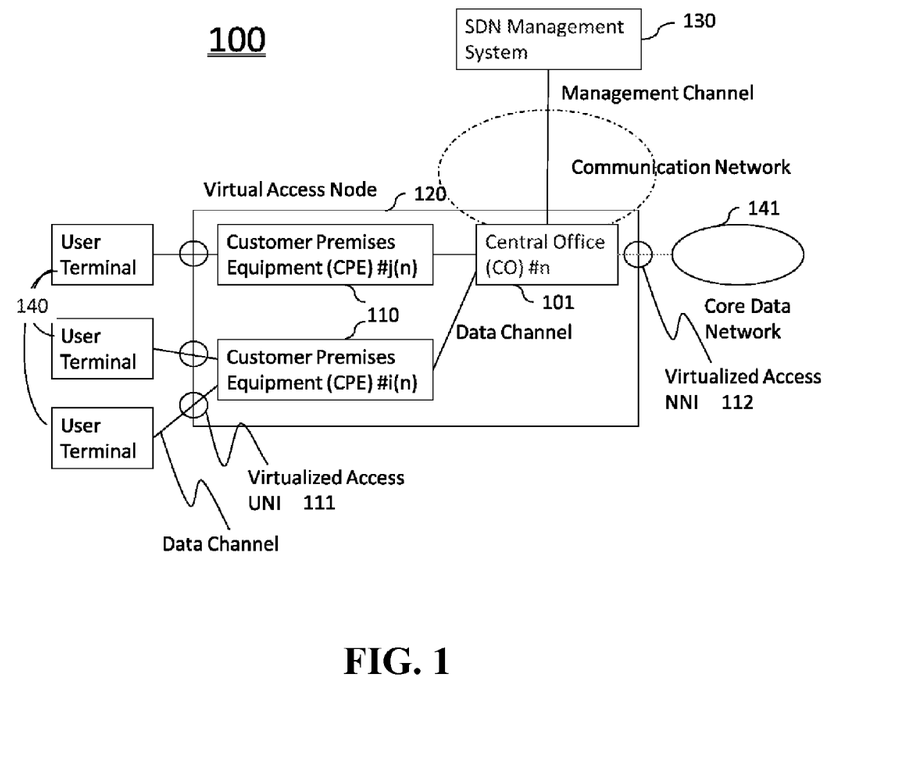
FIG. 1 is a block diagram of a virtual access node comprises a CO and more than one CPE.

In FIG. 1, a virtual access node 120 comprises a CO 101 and more than one CPE 110. The CO 101 of the virtual access node 120 communicates with a SDN Management System 130 through a management channel in a communication network. The SDN Management System 130 controls the virtual access node 120 as a single network node and the SDN Management System 130 understands more than one virtualized access UNI 111 and a virtualized access NNI 112 as the interface points of the virtualized access node 120 to interconnect with corresponding user terminals 140 and a core data network 141 for forwarding and receiving user data flows both in the downstream and the upstream directions. The SDN Management System 130 controls multiple virtual access nodes through the communication network.

Figure 2:
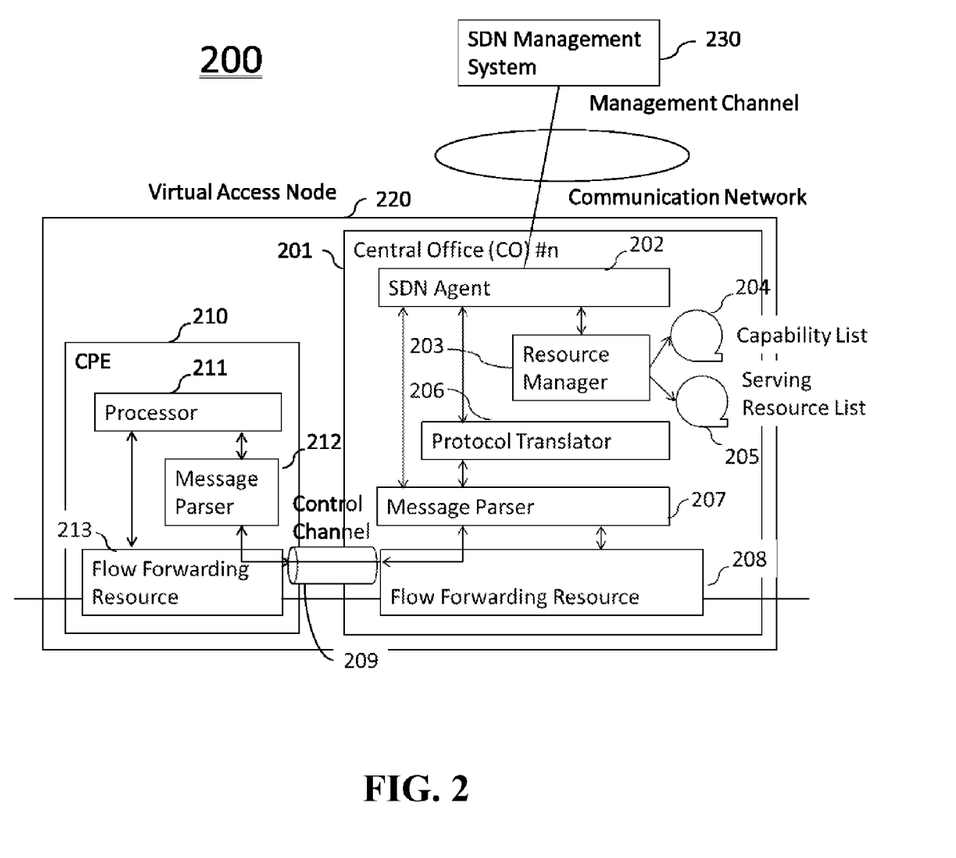
FIG. 2 is a schematic block diagram of a virtual access node presenting components reside inside of the CO and the CPE.

FIG. 2 describes function blocks in the virtual access node 220 of the current patent. A SDN Agent 202 resides inside of the CO 201 interacts with the SDN Management System 230 to send and receive SDN control messages. A Resource Manager 203 manages existing feature set in the CO 201 and all the CPE 210 in a Capability List 204 database and usage status of the feature set in a Serving Resource List 205 database. The mechanism of building the databases is the outside of the patent though it is a general understanding that the existing feature set in each device can be confirmed by knowing manufacture information and product number etc., those information are regularly collectable digital data as an attribute of a managed object. The Resource Manager 203 allocates appropriate resources to complete the flow forwarding request received from the SDN Management System 230 via the SDN Agent 202 and the Resource Manager 203 updates the usage status after made a resource allocation. A Protocol Translator 206 translates between a SDN control message and a legacy control message (i.e., a SDN non-native protocol) used in a device resides inside of the virtual access node 220, hence almost all of the today's deployed access nodes support only the legacy control message then translate a SDN control message to a corresponding legacy control message is a mandatory. A Message Parser 207 forwards the legacy control message received from the Protocol Translator 206 to the corresponding flow forwarding resources in the CO 201 and/or the corresponding CPE 210. When forwarding a control message to a CPE 210, the message will be passed to send/receive socket to transfer through a control channel 209 which is corresponding to that CPE 210. A Message Parser 212 resides inside of the corresponding CPE 210 receives the control message and forwards it to a Processer 211. The processor 211 determines the control message and configures the corresponding flow forwarding resources 213.

The SDN Management System 230 sends a configuration request to the virtual access node 220, the message is comprised of following elements as a minimum set of attributes but not limited;
  A virtualized access UNI identifier
  A virtualized access NNI identifier
  Forwarding action(s) requested
  Forwarding function will be varied by each virtual access node however it is assumed that following types of operation will be generally available;
  Packet reception/discarding rule
  VLAN manipulation (add/drop/transparent/swap etc.)
  Queue configuration
  Rate control, shaping and policing
  A flow forwarding request received from the SDN Management System 230 does not designate exact flow forwarding resources reside inside of the CO 201 and/or the corresponding CPE 210 to be configured then the message is needed to be broken into more than one partitioned control message. To resolve a resource(s) to be served for the flow forwarding request, the SDN Agent 202 passes the message to the Resource Manager 203 which allocates a set of appropriate flow forwarding resources and informs the allocation result to the SDN Agent 202 for generating a set of partitioned SDN control messages.

Figure 3:
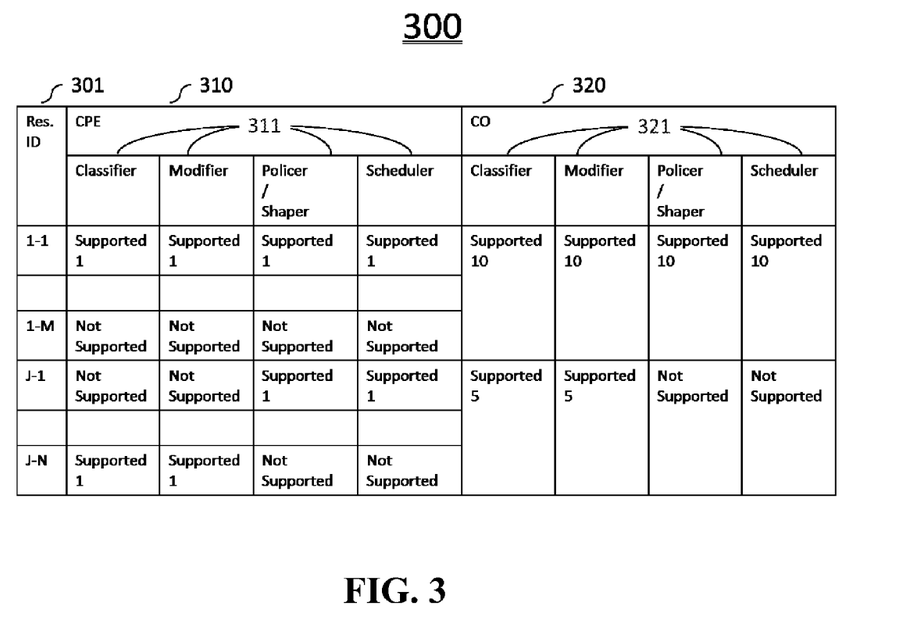
FIG. 3 is a logical representation of the Capability List database resides inside of the CO.
Figure 4:
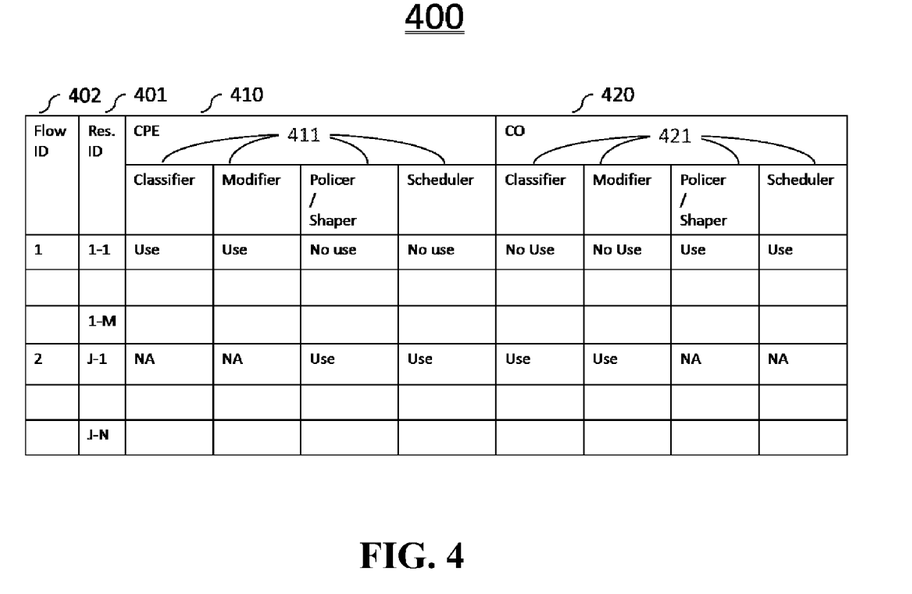
FIG. 4 is a logical representation of the Serving Resource List database resides inside of the CO.

The Resource Manager 203 manages two databases, the one is the Capability List 204 database which is shown in FIG. 3 and another is the Serving Resource List 205 database which is shown in FIG. 4 respectively.

FIG. 3 is a Capability List 300. The Capability List 300 consists of columns: a Resource ID (Res. ID) column 301, a break down list of a function set in the columns 311 of the CPE 310, and a break down list of a function set 321 of the CO 320. The list of a function set in the columns 311 and in the columns 321 can be the greatest set of possibly available functions in the CPE and the CO devices. The listed function names in the columns 311 and the columns 321 in FIG. 3 are defined in IEEE 1904.1™ Standard for Service Interoperability in Ethernet Passive Optical Networks (SIEPON) specification published from The Institute of Electrical and Electronics Engineers, Inc. (IEEE) as an example but it can be uniquely defined by a device depends on its supporting functions and operator's requirement.

As an example of the flow forwarding function set, the SIEPON specification defines functional blocks as following in the section 6.2.1.1 of the specification;
  Input block;
  Classifier block;
  Modifier block;
  Policer/Shaper block;
  Cross-Connect block;
  Queues block;
  Scheduler block; and
  Output block.

For the traffic forwarding purpose, Classifier, Modifier, Policer/Shaper, Queue, and Scheduler contribute a major role, and then utilize them as the function set in the Capability List 300 in FIG. 3.

A Res. ID column 301 in the table in FIG. 3 shows a combination of the flow forwarding resources of the CO 201 and the corresponding CPE 210 in FIG. 2; the virtual access node 220 has a multi-branch topology among the CO 201 and more than one CPE 210. Res. ID #1-1 stands a combination of the CPE #1 is connecting to the interface #1 of the CO, therefore, Res. ID #J-N stands a combination of the CPE #N is connecting to the interface #J of the CO as well. Each cross point in the matrix shows a support status of the function in the corresponding device. If marked as "Supported", the function is supported and functional by the device while marked as "Not Supported", the function is neither exist, available, nor enabled.

The Capability List 300 also provides number of the flow forwarding resources as a part of capability information. Followed by a remark of Supported, there is a suffix presenting usable existing number of resources. "Supported 1 (an example is the cross point of Res. ID #1-1 and the CPE Classifier)" means the function has one resource and "Supported 10 (an example is the cross point of Res. ID #1-1 and the CO Classifier)" means the function has ten resources. The information will be used when determining a new flow can be admitted to establish or not.

Note that the Capability List 300 should not be limited to the shown function set in the FIG. 3, however it can be varied and extensible or reduced by access technology in use.

The Resource Manager 203 in FIG. 2 identifies both or either the corresponding CPE and/or the CO has capabilities to fulfill the request from the SDN Management System 230. The determination of the usable resources is a system matter and then the selection algorithm is outside from this patent.

Once the Resource Manager 203 made a decision for the resources to serve for the request, the Resource Manager 203 updates the Serving Resource List 400 which is shown in FIG. 4. The Serving Resource List 400 shows which capabilities are used per flow basis. Since the SDN Management System 230 has no visibility of which of the flow forwarding resources are actually used inside of the CO 201 nor the CPE 210. The virtual access node 220 needs to maintain the usage status of the flow forwarding resources by its own.

There are two example flows in the Serving Resource List 400 in the FIG. 4. They are Flow ID #1 and Flow ID #2 as shown in the Flow ID column 402. Listed functions in the columns 411 and in the columns 421 for the CPE 410 and the CO 420 respectively in the Serving Resource List 400 are corresponding with those in the Capability List 300. In the Serving Resource List 400, each function is noted either "Use" or "No use" for available flows where the function exists. When specific function is not supported in the Capability List 300, the usage status must be "NA (Not Available)" in the Serving Resource List 400. Therefore, the Resource Manager 203 can identify that classifier and modifier in the CPE #1 have been used and Policer/shaper and scheduler in the interface #1 of the CO have been used.

The Capability List 300 and the Serving Resource List 400 are used in the process of a flow forwarding request admission. Here is an example; Res. ID 1-1 in the Capability List 300 shows the CPE #1 has one Classifier, and the Serving Resource List 400 shows the flow forwarding resource has been used by the Flow ID #1. Then, there is no more Classifier resource to be served for a new flow within the CPE #1. Therefore when the SDN Management System 230 request the virtual access node 220 to create a new Flow #X passing through CPE #1 which requires the Classifier in the CPE #1, the request will be rejected. This flow forwarding request admission mechanism is the same at the CO. And the flow forwarding request will be examined by checking full set of the required function exists and is available.

The Resource Manager 203 informs the SDN Agent 201 that which flow forwarding resources to be used for the requested flow forwarding action when the Resource Manager 203 determines the request is acceptable.

By receiving the flow forwarding resource information from the Resource Manager 203, the SDN Agent 201 generates a set of SDN control messages to configure the each of the flow forwarding resource independently resides inside of the CO 201 and/or the corresponding CPE 210. When the flow forwarding resource is in the SDN native device, the SDN Agent 201 forwards the SDN control messages to the Message Parser 208. When the flow forwarding resource is in the SDN non-native device, the SDN Agent 201 forwards the SDN control messages to the Protocol Translator 206 which translates the SDN control message to the legacy control message. The Message Translator 206 has a knowledge base of the relationship between each of the SDN control message and the corresponding legacy control message. The relation does not have to be one to one but it can be one to many or many to one, and the translation rule will be varied by each of the virtual access node. The translation rule itself is outside of the scope from this patent. When a CO and more than one CPE are SDN native however their using SDN control message has a different arrangement with the SDN control message used by the SDN Management System 230, the translation knowledge base in the Protocol Translator 206 can be extended to maintain the translation and mapping between those two different sets of SDN control message.

The Protocol Translator 206 determines a Destination Address (DA) of each control message. Examples of the DA are IP address, MAC address, Logical Link Id, and device Id which is identical to designate the CO and/or the CPE. Then assembled control messages by the Protocol Translator 206 are forwarded to the Message Parser 207.

The Message Parser 207 identifies address information in the control message header which is usually defined as the Destination Address (DA) and forwards each of the legacy control message to the corresponding flow forwarding resource in the CO 201 or forwards to the corresponding CPE 210 through the corresponding control channel 209. When the corresponding CPE 210 receives the legacy control message through the control channel 209, the Message Parser 212 resides inside of the CPE 210 forwards the control message to the Processor 211. The Processor 211 configures flow forwarding resources 213 in the CPE and replies an acknowledgement according to the protocol.

The Message Parser 207 forwards an acknowledgement to the SDN Agent 202 in response to delivering the SDN control message or to the Protocol Translator 206 in response to the delivering the legacy control message. The Protocol Translator 206 then translates the acknowledgement from the legacy control message to the SDN control message and forwards it to the SDN Agent 202.

Figure 5:
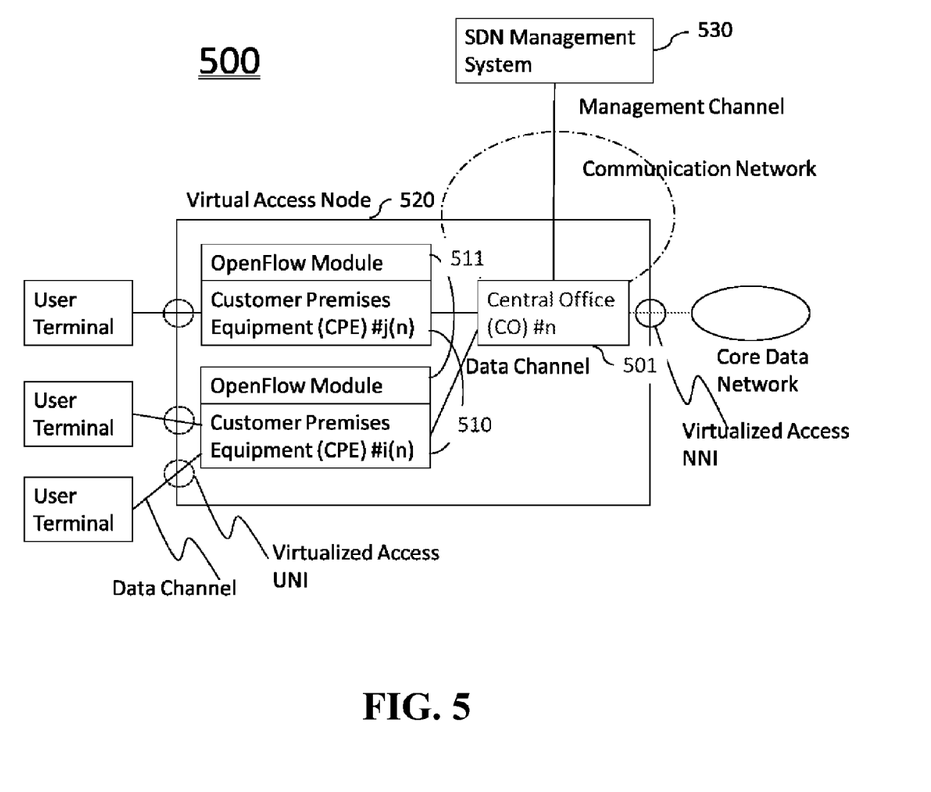
FIG. 5 is a block diagram of a virtual access node with more than two SDN native CPE.

FIG. 5 shows a use case that a SDN native CPE 510 supports a SDN control message processing capability in the OpenFlow module 511. A similar use case is discussed in the industry groups such that European Telecommunications Standards Institute (ETSI) and Broadband Forum (BBF). Published ETSI GS NFV 001 V1.1.1 (2013-10) is discussing the SDN native CPE in the "Use Case #9: Fixed Access Network Functions Virtualisation" in the Section 13. With regards to the proposed configuration of the paper, this patent can adapt with discussed use case in the following two manners.

(a) The first case is to handle the CO 501 and the CPE 510 as standalone SDN native devices respectively. The Resource Manager 203 in the FIG. 2 has no role to allocate a flow forwarding resource to the request from the SDN Management System 530; it means that the SDN Management System 530 knows an exact SDN control message to configure each device. By receiving the SDN control message from the SDN Management System 530 the Resource Manager 203 will simply update the usage status in the Serving Resource List 205 based on the request.

(b) The second case is an access node is virtualized as a single virtual access node 520 and SDN Management System 530 only identifies the virtual access node but not each of the CO 501 or the corresponding CPE 510. In this case, it is assumed that the SDN Management System 530 controls an abstracted function which is supported by the virtual access node 520 but not controls the exact application interface of each device by the forwarded SDN control message. The SDN Agent 202, the Resource Manager 203, and the Message Parser 207 exist inside of the virtual access node 220 in FIG. 2 exist inside of the virtual access node 520 as same as the virtual access node 220. The SDN Agent 202 requests the Resource Manager 203 to allocate a resource(s). After the resource allocation, as same as the case to control a legacy device(s), the SDN Agent 202 generates a set of SDN control messages to control each CO 501 and CPE 510 individually. Once the set of SDN messages for each device is generated, there is no need to translate the SDN control message to a legacy control message. The SDN Agent 202 forwards the SDN control messages to the Message Parser 207 directly, and it then forwards the messages to the each of flow forwarding resource.

SDN control message such as OpenFlow is defined as a protocol being used in the layer three (3); i.e., network layer. At the time of forwarding a SDN control message to a CPE via a CO, there is a possibility that the SDN control message needs to be encapsulated and forwarded in the layer two (2); i.e., datalink layer, but not in the layer three (3). Patent filed as Ser. No. 14/256,011 entitled "ARCHITECTURE FOR AN ACCESS NETWORK SYSTEM MANAGEMENT PROTOCOL CONTROL UNDER HETEROGENEOUS NETWORK MANAGEMENT ENVIRONMENT" invented by Toshihiko Kusano has already proposed a solution for the encapsulation.

Figure 6:
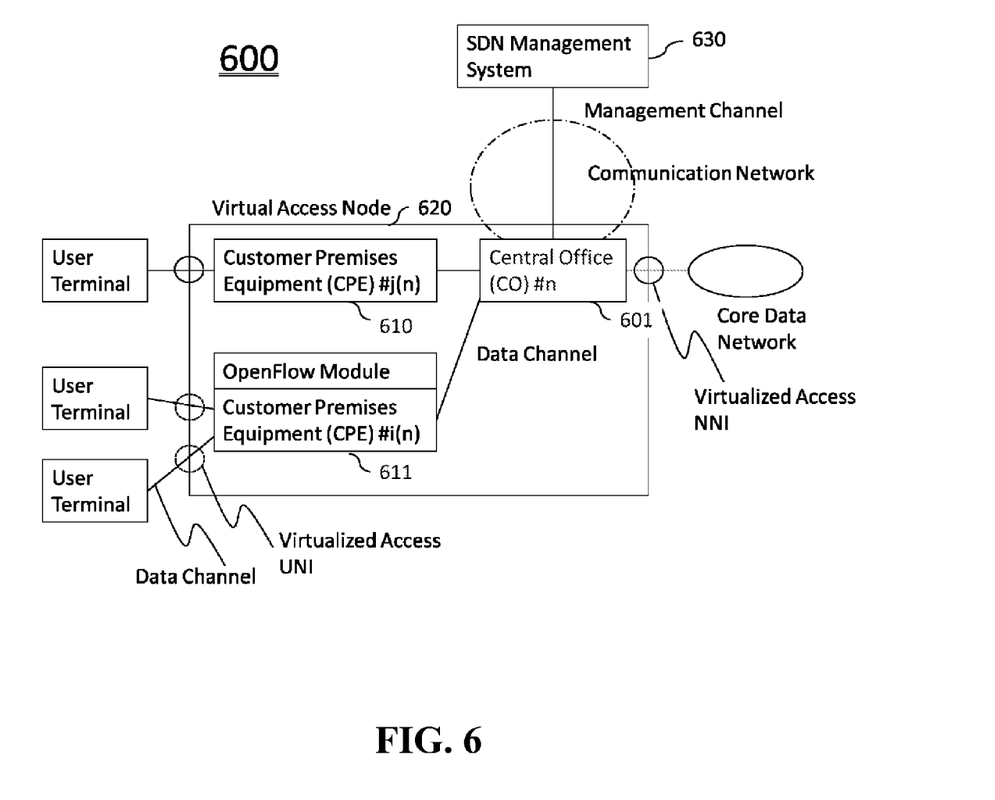
FIG. 6 is a block diagram of a virtual access node with both more than one SDN non-native CPE and more than one SDN native CPE.

FIG. 6 shows a use case with mixed CPE configuration consists from both a SDN non-native CPE 610 and a SDN native CPE 611 in the virtual access node 620. They exist simultaneously under the same CO 601. In this use case, both CPE can be managed seamlessly from the SDN Management System 630 with utilizing the flow forwarding configuration control discussed in this patent.

What is claimed is:

1. A virtual access node comprising:
a Central Office (CO) configured to communicate with more than one Customer Premises Equipment (CPE) via a control channel;
the more than one CPE, each of the more than one CPE configured to communicate with the CO via the control channel;
a plurality of interface points consisting of more than one virtualized access User Network Interfaces (UNI) and a virtualized access Network Node Interface (NNI), wherein each of the more than one virtualized access UNI corresponds to each of the more than one CPE and provides an interface point between the corresponding CPE and a corresponding user terminal, and the virtualized access NNI provides an interface point between the CO and a core data network;
a Software Defined Network (SDN) Agent, residing inside of the CO, configured to send/receive SDN control messages to/from a SDN Management System and generate a partitioned SDN control message from a SDN control message received from the SDN Management System, wherein flow forwarding resources in both the CO and the more than one CPE are configured based on the partitioned SDN control message;
a Resource Manager, residing inside of the CO, configured to maintain a Capability List database and a Serving Resource List database;
a Protocol Translator, residing inside of the CO, configured to translate between the SDN control message and a legacy control message; and
a Message Parser, residing inside of the CO, configured to determine at least one of the flow forwarding resources for delivering the SDN control message and the legacy control message and forward the SDN control message and the legacy control message based on the determination,
wherein the virtual access node has a function set that is determined by the underlying CO and the underlying more than one CPE.

2. The virtual access node of claim 1, wherein the SDN Agent is further configured to:
communicate with the SDN Management System, which controls the virtual access node,
request the Resource Manager to allocate the flow forwarding resources by forwarding the SDN control message,
receive a resource allocation result from the Resource Manager, and
if both the CO and the more than one CPE are SDN native, then partition the SDN control message into CO and/or CPE oriented SDN control messages to configure the flow forwarding resources that reside in the CO and/or the more than one CPE, and forward the CO and/or CPE oriented SDN control messages to the Message Parser, and
if either the CO or the more than one CPE is non-SDN native, then forward the SDN control message to the Protocol Translator, and receive one or more reply messages and/or an acknowledge message for the SDN control message from Protocol Translator and Message Parser.

3. The virtual access node of claim 1, wherein the Resource Manager is further configured to:
maintain Capability List and Serving Resource List within the Capability List database and the Serving Resource List database, respectively, and
if the Capability List will be generated when identifying a capability of the CO and/or the more than one CPE, the CO will be identified at the time of boot up, and the more than one CPE will be identified when the more than one CPE is registered at the hosting CO, while the skeleton of the Serving Resource List will be generated at the same time the Capability List is generated and every time the Resource Manager updates when allocating and deallocating resources for each flow,
evaluate one or more available resources in the CO and/or the more than one CPE to complete a request received from the SDN Agent by looking up the Capability List and the Serving Resource List and allocating one or more appropriate resources when available to configure the requested forwarding.

4. The virtual access node of claim 1, wherein the Protocol Translator is further configured to:
translate between the SDN control message and the legacy control message, which is used by the CO and the more than one CPE, and add a proper message header with destination address to the legacy control message.

5. The virtual access node of claim 1, wherein the Message Parser is further configured to:
deliver the SDN control message and the legacy control message to the corresponding flow forwarding resource in the CO and/or the more than one CPE, wherein the SDN control message and the legacy control message are received from the SDN Agent and the Protocol Translator, respectively, and
forward an acknowledgement to the SDN Agent in response to delivering the SDN control message or to the Protocol Translator in response to delivering the legacy control message.

* * * * *